US009767291B2

(12) United States Patent
Hoernecke et al.

(10) Patent No.: US 9,767,291 B2
(45) Date of Patent: Sep. 19, 2017

(54) SYSTEMS AND METHODS FOR SECURITY AND RISK ASSESSMENT AND TESTING OF APPLICATIONS

(71) Applicant: NETFLIX, INC., Los Gatos, CA (US)

(72) Inventors: Andy Hoernecke, Los Gatos, CA (US); Jason Chan, Los Gatos, CA (US)

(73) Assignee: NETFLIX, INC., Los Gatos, CA (US)

( * ) Notice: Subject to any disclaimer, the term of this patent is extended or adjusted under 35 U.S.C. 154(b) by 8 days.

(21) Appl. No.: 14/876,354

(22) Filed: Oct. 6, 2015

(65) Prior Publication Data

US 2017/0098086 A1    Apr. 6, 2017

(51) Int. Cl.
| | | |
|---|---|---|
| *H04L 29/06* | (2006.01) | |
| *G06F 21/57* | (2013.01) | |
| *G06F 11/36* | (2006.01) | |
| *G06Q 10/06* | (2012.01) | |
| *G06Q 10/10* | (2012.01) | |

(52) U.S. Cl.
CPC ........ *G06F 21/577* (2013.01); *G06F 11/3688* (2013.01); *G06Q 10/0635* (2013.01); *G06Q 10/10* (2013.01)

(58) Field of Classification Search
CPC .................................................... G06F 21/577
See application file for complete search history.

(56) References Cited

U.S. PATENT DOCUMENTS

| | | | | |
|---|---|---|---|---|
| 7,693,961 | B2 * | 4/2010 | Nomura | .................... G06F 8/61 |
| | | | | 709/219 |
| 8,990,368 | B2 * | 3/2015 | DeHaan | .................. H04L 67/16 |
| | | | | 709/223 |

(Continued)

FOREIGN PATENT DOCUMENTS

WO    WO 2013-184137 A1    12/2013

OTHER PUBLICATIONS

International Search Report and Written Opinion issued on Dec. 2, 2016 in International Application No. PCT/US2016/055352; 15 pp.

(Continued)

*Primary Examiner* — Shawnchoy Rahman
(74) *Attorney, Agent, or Firm* — Haynes and Boone, LLP; Taylor Merritt Meacham

(57) ABSTRACT

Provided herein are systems and methods for monitoring and assessing the security and risk presented by applications deployed in a complex computing environment. An exemplary application security system includes a server having a processing device in communication with storage systems, computing devices executing application instances configured to receive and transmit information over a network, and a security testing system including a first test module that is associated with a first application, which is associated with one or more of the application instances. The processing device of the server retrieves information about the first application, including current dependency information of the first application, calculates a security risk score for the first application based on the information, determines a security priority level associated with first application, and associates the security priority level of the first application with the first application in a database of application security information.

18 Claims, 7 Drawing Sheets

(56) References Cited

U.S. PATENT DOCUMENTS

| | | | | |
|---|---|---|---|---|
| 2006/0107271 | A1* | 5/2006 | Irving | G06F 12/023 |
| | | | | 719/316 |
| 2006/0130026 | A1* | 6/2006 | McHugh | G06F 17/212 |
| | | | | 717/141 |
| 2010/0251215 | A1* | 9/2010 | Yawalkar | G06F 11/008 |
| | | | | 717/125 |
| 2012/0240212 | A1* | 9/2012 | Wood | G06F 21/33 |
| | | | | 726/10 |
| 2014/0282820 | A1* | 9/2014 | Walton | G06F 21/53 |
| | | | | 726/1 |
| 2014/0380277 | A1 | 12/2014 | Bhagavatula | |
| 2015/0006677 | A1* | 1/2015 | Mahajan | H04L 67/02 |
| | | | | 709/219 |
| 2015/0007138 | A1 | 1/2015 | Sabetta | |
| 2015/0365437 | A1* | 12/2015 | Bell, Jr. | H04L 63/20 |
| | | | | 726/1 |

OTHER PUBLICATIONS

Zech, et al.; "Towards a Model-Based Security Testing Approach of Cloud Computing Environments"; IEEE 6$^{th}$ Intl Conference on Software Security and Reliability Comparison; Jun. 20, 2012; 10 pp.

* cited by examiner

Deployed Applications

| Name | Score | Category | Production Build | | | Test Build | | | |
|---|---|---|---|---|---|---|---|---|---|
| | | | us-east-1 | us-west-1 | us-west-2 | eu-west-1 | us-east-1 | us-west-1 | us-west-2 | eu-west-1 |
| APP_i498 | 30 | 4 | | | | | ✓ | | | |
| APP_k8d7 | 95 | 1 | | | | | ✓ | | | |
| APP_n47d | 25 | 4 | ✓ | | | | ✓ | | | |
| APP_l92h | 5 | 5 | ✓ | | ✓ | | ✓ | | ✓ | |
| APP_i498 | 30 | 4 | ✓ | | | ✓ | ✓ | | ✓ | |
| APP_mc7d | 45 | 3 | | | | | ✓ | | | |
| APP_2hsa | 65 | 2 | ✓ | | | | ✓ | | | |
| APP_n7m7 | 15 | 5 | ✓ | | | | | | | ✓ |
| APP_t1m2 | 50 | 3 | ✓ | | | | | | | |
| APP_i497 | 80 | 1 | | | ✓ | | | ✓ | | |
| APP_6h1m | 70 | 2 | ✓ | | | | ✓ | | | ✓ |
| APP_5a1m | 75 | 2 | | | | ✓ | ✓ | | | |
| APP_1c1m | 50 | 3 | ✓ | | ✓ | | | | | ✓ |
| APP_t8j3 | 60 | 2 | | | | | ✓ | | | |
| APP_n35m | 20 | 4 | | | | | | | | ✓ |
| APP_jklm | 35 | 4 | ✓ | | | | | | | ✓ |
| APP_j489 | 30 | 4 | ✓ | | | | | | | ✓ |

FIG. 3

File  Edit  Tools  View  Window  Help                                    _  □  X User_Identifier APPLICATION (Summary by Deployment Region)  402

| Metrics 404 | Production Build | | | | Test Build | | |
|---|---|---|---|---|---|---|---|
| 406 | us-east-1 | us-west-1 | us-west-2 | eu-west-1 | us-east-1 | us-west-1 | us-west-2 | eu-west-1 |
| Dependent Applications | 25 pts. (443) | 10 pts. (19) | 10 pts. (41) | 25 pts. (194) | 25 pts. (402) | 10 pts. (34) | 10 pts. (40) | 25 pts. (166) |
| Edge | 0 pts. (0) | 0 pts. (0) | 0 pts. (0) | 0 pts. (0) | 0 pts. (0) | 0 pts. (0) | 0 pts. (0) | 0 pts. (0) |
| Instances | 0 pts. (12) | 0 pts. (2) | 0 pts. (9) | 0 pts. (2) | 0 pts. (2) | 0 pts. (2) | 0 pts. (2) | 0 pts. (2) |
| Uses Sensitive Services | 10 pts. (1) | 10 pts. (1) | 10 pts. (1) | 10 pts. (1) | 10 pts. (1) | 10 pts. (1) | 10 pts. (1) | 10 pts. (1) |
| Is Sensitive | 25 pts. (1) | 25 pts. (1) | 25 pts. (1) | 25 pts. (1) | 25 pts. (1) | 25 pts. (1) | 25 pts. (1) | 25 pts. (1) |

SYSTEMS AND METHODS FOR SECURITY AND RISK ASSESSMENT AND TESTING OF APPLICATIONS

TECHNICAL FIELD

The present disclosure relates generally to the security assessment and testing of applications deployed in a computing environment.

BACKGROUND

Increasingly, information is stored and accessed across an array of computing devices that operate in conjunction to provide a variety of services. For example, an email user may use a client computing device to communicate with an authentication server configured on the edge of an email service provider's network. The email user may access email from an email storage server, such that these three devices communicate together to provide a seemingly simple Internet-based service.

Service provider networks have increased along with increasing reliance and use on such networks for media access, communication platforms, banking and commerce, and others. The complexity of service provider networks may include many different applications executing on many different devices on the inside of the network and at the edge of the network and may include devices operating outside the service provider's physically controlled network.

The increase in size and complexity of these networks and in the numbers of applications executing thereon has complicated efforts to maintain the security of these environments. And as consumers and businesses have begun relying increasingly on such networks, which they may access from anywhere via the Internet, those consumers and businesses exchange an increasing amount of sensitive information. While many different technologies have been developed to improve the security of service provider networks, these technologies have not proven entirely satisfactory.

BRIEF DESCRIPTION OF THE DRAWINGS

FIGS. 3, 4, and 5 are exemplary user interfaces that may be provided by in connection with the application security server of FIG. 1, according to some embodiments of the present disclosure.

Figure 1:
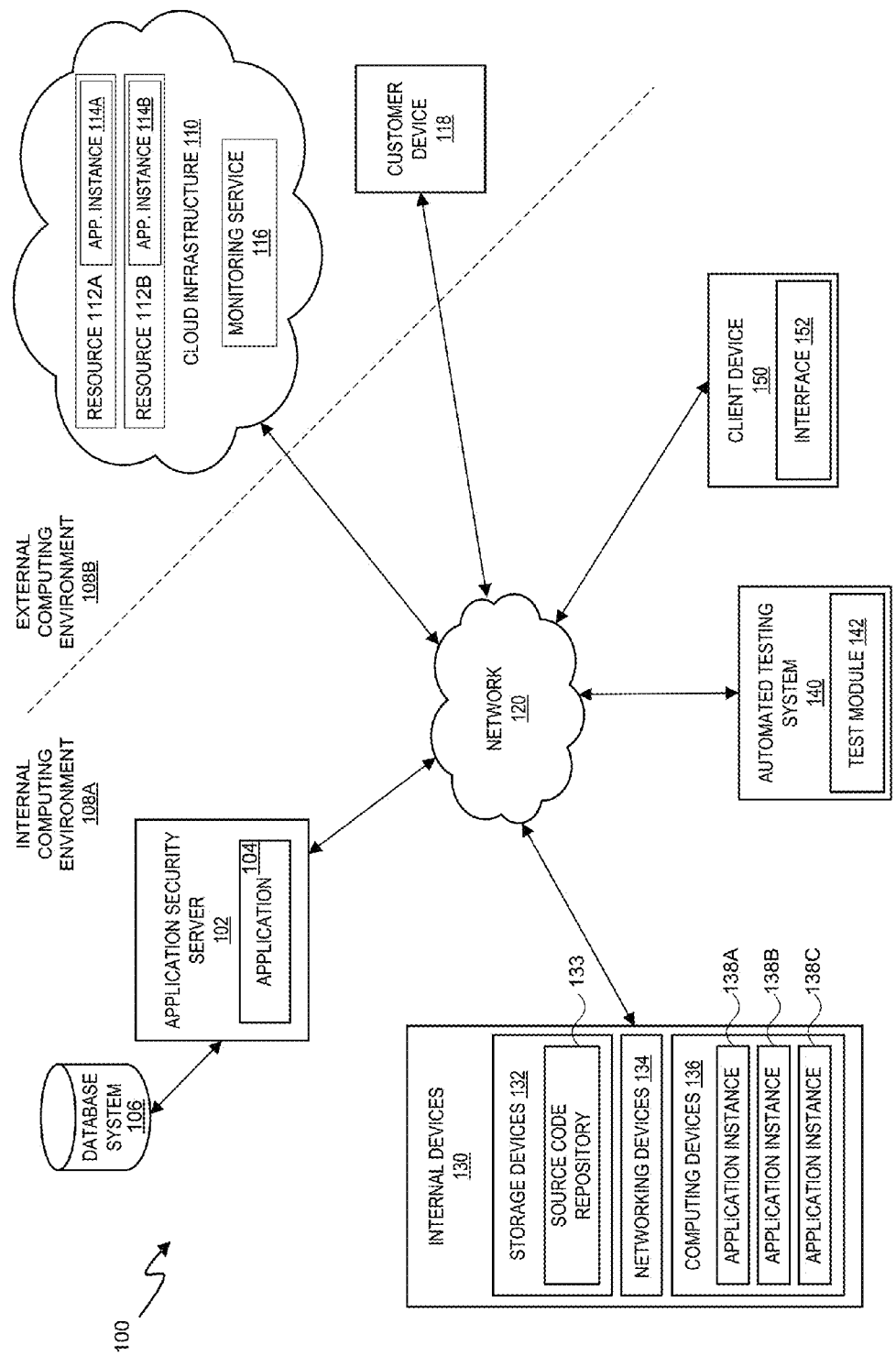
FIG. 1 is a block diagram of application security system including an application security server, according to some embodiments of the present disclosure.

These drawings will be better understood by those of ordinary skill in the art by reference to the following detailed description.

DETAILED DESCRIPTION

With references to the drawings briefly described above, exemplary applications of systems and methods according to the present disclosure are described in this section. These examples are provided to add context and aid in the understanding of the invention. It will thus be apparent to one skilled in the art that the present invention may be practiced without some or all of these specific details. In other instances, some well-known process steps have not been described in specific detail in order to avoid unnecessarily obscuring the present disclosure. Additionally, other applications of the concepts and principles described herein are possible, such that the following examples should not be taken as limiting. For example, while many of the examples disclosed herein are directed to the assessment, categorizing, and testing of applications in the context of a streaming video service, the principles and concepts described may be applied to provide more generally for the secure management and maintenance of large numbers of applications and a service provider network.

In the following detailed description, references are made to the accompanying drawings, which form a part of the description and in which are shown, by way of illustration, some specific embodiments of the present disclosure. Although these embodiments are described in sufficient detail to enable one skilled in the art to practice the invention, it is understood that these embodiments are not limiting, such that other embodiments may be used, and changes may be made without departing from the spirit and scope of the invention. For example, changes within the scope of this disclosure may include performing an operation on a different system or device, in a different order, etc.

Devices, systems, and methods are provided for assessing and categorizing the security risks associated with a large number of applications operating within a computing environment. The computing environment may be a service provider network, embodiments of which may include an internal network environment and an external network environment, such as an account on a cloud computing infrastructure operated by a third-party on behalf of the service provider. In order to provide services to customers, the service provider's network may include many different applications that cooperate together to provide many different portions of one or more different services provided by the service provider. For example, the service provider may operate a service provider network to provide streaming media services to customers. In providing those streaming media services to its customers, the service provider may have recommendation applications, interface applications, streaming media applications, billing and payment applications, and other applications bundled together in a service-oriented architecture as the streaming media service presented to the customer as a unified computing environment included in the service provider network. In a large-scale service provider network with a service-oriented architecture, such applications may number well into the thousands or tens of thousands.

Each application presents a potential for security risk. However, some applications may present a greater security risk than other applications. For example, if an application has access to the credit card numbers and addresses of users of the service provider's services, the service provider may be subject to legal penalties as well as a loss of goodwill on the part of its customers should a data breach occur. In contrast, if an application breach compromises a user's email address only, the potential downside to the user is significantly less. Additionally, some applications may be frequently relied upon by other applications. An exploit involving such an application may potentially result in compromising many of the other relied upon applications and may potentially cause downtime or an availability impact due to the reliance or dependencies between applications. Consequently, an application may present a security risk based on the applications that it communicates with or depends on. Additionally, some applications may be instantiated many more times within the service provider network than other applications. When there are more instances of a given application, an exploit associated with that application may present a greater security threat.

Embodiments of the present disclosure may collect application security information, i.e. information relating to or indicative of potential security risks posed by the application, and determine a security risk score and/or security level associated with that application. Within the service provider's overall system, the security risk score associated with a particular application may change dynamically. For example, during times of increased usage of the service provider services, such as in the evening for streaming media services, the number of instances of a particular application may increase substantially. The security risk, and therefore the security risk score, associated with the application may increase as the number of instances increases. As another example, when a new feature is rolled out to customers of the service provider system, applications associated with the new feature may pose increasing security risks as the number of users adopting and using the new feature increases.

Additional examples of application security information may include interdependencies between applications, security groups or classifications applicable to each instance of the application, build information associated with the application or with individual deployed instances, particularly where multiple builds are deployed simultaneously, like a production build and a test build. For example, a newer build or an older build may be determined by administrative security personnel to pose a greater or lesser security risk and so a security risk score calculated for the newer build or older build may be higher or lower. Other examples of application security information may include an owner of an application or a developer thereof, an indication of ports, protocols, and/or domain name system (DNS) names utilized by the application. Additionally, whether or not the application to be scored faces the Internet, e.g. operates at the edge of the service provider's internal network environment, may be a useful indicator of security risk. In some embodiments, applications may be manually tagged with attributes that indicate potential security risk. For example, an application may be tagged as sensitive based on the type of data it processes. An application that processes payment information may be coded to include such a tag that may be read by an application security system. The location of the source code or information derived from the source code itself may also be to obtain application security information for operations that calculate a security risk score for a given application and that perform tests thereon.

Based on the security risk score, the applications present within the service provider system may be ranked, prioritized, and/or categorized in order to provide and perform an appropriate security testing regime. Additionally, logging requirements, access controls, and other control and/or monitoring techniques may be required for individual applications based on their security risk scores. For example, the security risk scores of applications may range from 0 to 100, in a given embodiment, with 100 being the highest score associated with the application or applications that pose the greatest security risk. In some embodiments, the application security system, as described herein, may indicate that all applications scoring greater than 80 should be subject to a first testing regime of automated security tests or security test modules and all applications scoring 80 or less but more than 60 should be subject to a second testing regime of automated tests. The first regime of security tests may include more tests or more stringent tests than the second regime of automated tests. In another embodiment, all applications scoring greater than 60 may be flagged or included on a list for manual security testing such as, penetration testing, by administrative security personnel; while all applications scoring 60 or less but more than 50 may be subject to a first security test every two weeks and all applications scoring 50 or less but more than 40 may be subject to the first security test every month.

In some embodiments of the present disclosure, the security testing regime may be automatically implemented in connection with a security testing system that is part of the service provider's overall system. In other embodiments of the present disclosure, recommendations of a particular security testing regime may be provided to administrative security personnel in a notification accessed via a user interface.

Additionally, compliance with a security testing regime may be determined by receiving testing information from the security testing system. For a particular application, the testing information may indicate a type of test or tests performed and a most recent test time or date on which those tests were performed. In some embodiments, the testing information may be used in calculating the security risk score associated with a given application. For example, if a first application is subjected to weekly security tests, this may lower the security risk score of the application.

The sheer number of applications that may be present in today's service provider networks may make it impossible for a manual approach to security assessment. As described herein, security assessments may include determinations of the security of a particular application and determinations of the risk presented by that application assuming a breach or lapse in security were to occur. Additionally, the level of security and the level of risk associated with an application may fluctuate quickly and suddenly based upon changes associated with the application itself, changes associated with other related applications, and changes in usage and features of the service provider network. Embodiments of the present disclosure facilitate security and risk assessment, categorization, and testing (including manual and/or automated testing) of such applications at scale.

Referring now to FIG. 1, shown therein is a block diagram of an application security system deployed in a service provider system 100. The service provider system 100 may include an application security server 102 having a security application 104 executing thereon. The application security server 102 may access and store information in the couple the database system 106. In some embodiments, the database system 106 is present in a memory of the application security server 102. The service provider system 100 includes a plurality of components that constitute or are included in an internal computing environment 108A and components that are included in an external computing environment 108B. The environments 108A and 108B are illustrated in FIG. 1 as being separated by a dashed line.

As described herein, embodiments of the application security server 102 may include a processing device in communication with one or more storage systems or devices. The application security server 102 may be configured to receive information from a plurality of networked resources and, based on that information, calculate a security risk score for a plurality of applications. For example, the application security server 102 may be operated by a service provider such as Netflix, Inc. of Los Gatos, Calif., which may also operate systems for the creation of user accounts and for the receipt and consumption of media content, such as movies, television shows, and other video-based and/or audio-based programming and permitting users to interact with respect to such media content.

The service provider system 100 may include an account on the cloud infrastructure 110. As illustrated, the cloud infrastructure 110 includes a plurality of resources or resource instances thereon. These resources may be physical servers, storage devices, and networking devices or may be understood as virtual servers, virtual storage devices, and/or virtual networking devices. Application instances 114A and 114B may execute on the resource instances 112A and 112B, respectively.

As noted, FIG. 1 illustrates that the application security server 102 may communicate with the cloud infrastructure 110 over network 120. The cloud infrastructure 110 may include a plurality of servers and storage devices configured to provide a plurality of resource instances 112A and 112B and other resources instances. For example, one of many examples of an appropriate cloud infrastructure 110 may be or be similar to the distributed computing, storage, and networking infrastructure provided by Amazon Web Services, Inc. (AWS). As a non-limiting example in which the cloud infrastructure 110 is AWS, the exemplary resource instances 112A and 112B may be provided by a plurality of Amazon Elastic Compute Cloud (EC2) instances, a plurality of database instances such as an Amazon Relational Database Service (RDS) instance, and storage instances such as an Amazon Simple Storage Service (S3) bucket, and each of instances 112A and 112B may be provided by a plurality of computing and/or storage devices. The operator of the application security server 102 may deploy a plurality of applications to the cloud infrastructure 110, such that the application instances 114A and 114B are executed on hardware owned by a third-party operator, such as AWS. Other cloud infrastructures may be used to provide the cloud infrastructure 110. Other examples may include cloud services CenturyLink Cloud provided by CenturyLink, Inc., Microsoft Azure provided by Microsoft, Inc., and services provided by Rackspace, Inc, and others.

In some embodiments, the cloud infrastructure 110 includes a monitoring service 116 that may collect application security information associated with the application instances 114A and 114B. The monitoring service 116 may be an application deployed by the operator of the service provider system 100 to monitor applications or application instances deployed by the service provider to provide one or more services to the service provider's customers. In some embodiments, the monitoring service 116 may be provided by more than one application. For example, the monitoring service 116 may include ASGARD, a web-based cloud management and deployment tool, created by Netflix, Inc. Other embodiments may include other implementations of the monitoring service 116. The monitoring service 116 may identify applications of the service provider that are deployed within the cloud infrastructure 110, as well as interdependencies between those applications. For example, application instance 114A may rely on and communicate with the application instance 114B to access information needed by the application instance 114A to provide the particular service or services for which was designed. The monitoring service 116 may collect and/or create application security information describing the dependence of application instance 114A on the application instance 114B. The monitoring service 116 may also include an identification of any security groups or security tags associated with the instances 114A and 114B.

These application instances 114A and 114B may be used by the service provider, as part of the service provider system 100, to provide a service to a customer who accesses the service provider system 100 in order to receive the service. The service provided by the service provider may be a streaming media service, a download based media service, and email service, a messaging or communication service, a banking service, and e-commerce service, and/or other such services. The application instances 114A and 114B may be associated with a security group or have a security tag depending on the type of service provider thereby. The customer may use a customer device 118 to interact with the service provider system 100, including the application instances 114A and 114B deployed within the cloud infrastructure 110, over a network 120.

As described herein, data communications between the application security server 102, the cloud infrastructure 110, and other components and devices illustrated in FIG. 1, may be transmitted over the network 120, which may include one or more networks such as a LAN, a WAN, a WWAN, a WLAN, a mobile telephone network, a landline telephone network, as well as other suitable networks. The network 120 may include a plurality of networks coupled together. As shown in FIG. 1, network 120 may include a private network, such that communication between the application security server 102 and a collection of internal devices 130 may not pass over publicly available communication lines or may be suitably encrypted for transit over the publicly available communication lines. For example, communications between the application security server 102 and the cloud infrastructure 110 may be encrypted to provide a virtual network over a public network, such as the Internet. The customer device 118 may communicate with one or more of the internal devices 130 and/or with the cloud infrastructure 110 over the Internet. Accordingly, the illustrated network 120 may include private networks, including virtual private networks (VPNs), and a public network or networks.

In the internal computing environment 108A of the service provider system 100, the application security server 102 may communicate over the network 120 the set of internal devices 130. As illustrated, these internal devices 130 may include storage devices 132, networking devices 134, and computing devices 136. The storage devices 132 may be one or more storage devices, such as hard drives, RAID configurations, storage area networks (SANs), and/or other systems. The storage devices 132 may include a source code repository 133 that includes source code for all or some of the applications deployed within the service provider system 100, on the internal devices 130 and/or the resource instances 112A and 112B of the cloud infrastructure 110. The storage devices 132 may also include application security information, which may be obtained from a variety of other sources as is described herein. The networking devices 134 may include switches, routers, and other networking devices that permit communication among and between the storage devices 132, the computing devices 136, and with other devices via the network 120.

The computing devices 136 may be a plurality of servers, such as a cluster or clusters of servers that execute a plurality of application instances, illustrated as exemplary application instances 138A, 138B, and 138C. Exemplary servers may include, for example, stand-alone and enterprise-class servers operating a server operating system (OS) such as a MICROSOFT® OS, a UNIX® OS, a LINUX® OS, or another suitable server-based operating system. It should also be appreciated that the application security server 102 may be provided by such exemplary servers.

The internal devices 130 may include a plurality of services that operate there on. For example, an internal web service framework may be included in the service provider system 100 so that when the application instances 138A, 138B, and 138C are loaded up, the instances 138A-C may generate dependency information based on JAVA™ archive files, or jars, other files that are loaded up during the process. For example, the internal web service framework may be the Netflix Internal Web Service Framework (NIWS), which may be used to create a mapping of dependencies of applications operating among the internal devices 130. In some instances, a first application may load up files that indicate a dependency on a second application with which the first application does not actually communicate during operation. Accordingly, some embodiments of the dependency mapping may over-represent actual dependencies of any given application for instance thereof. In some embodiments, actual dependency information may be provided by monitoring communications among the internal devices 130 by scraping Ethernet or Internet Protocol (IP) headers associated with communicated packets. The information scraped from the packet headers may then be used to create an actual dependency mapping of applications deployed on the internal devices 130. The mapping may be used to generate a list of applications having instances running within the service provider system 100.

The service provider system 100 may further include an automated security testing system 140. The automated testing system 140 may be a tool configured to perform a plurality of security tests on applications present within the service provider system 100. The automated testing system 140 may provide a plug-in interface for one or more test modules, like the exemplary test module 142. For example, the test module 142 may be a test application or test tool such as an OWASP Zed Attack Proxy (ZAP) web application scanner, an Nmap security scanner, a Nessus scanner, or other security tool.

The automated testing system 140 may be configured to utilize one or more test modules like the test module 142 to perform a security test of one or more applications deployed within the service provider system 100. A security test may be performed by a single test module, or by a plurality of test modules, with the output of one test module providing an input to another, in some embodiments. The test modules utilized by the automated testing system 140 may scan for several types of vulnerabilities. The automated testing system 140 may include a testing regime associated with each of a plurality of applications. For example, for a first application the automated testing system 140 may have a testing regime that calls for a particular test module to be run on a specific schedule, such as monthly at a particular time, or weekly at a particular time. The automated testing system 140 may be configured to provide application security information to the application security server 102 in the form of testing regimes associated with one or more of the applications deployed within the service provider system 100.

Additionally, the application security server 102 may be configured to direct the automated testing system 140 to create, modify, or delete a testing regime for a particular application. For example, the application security server 102 may receive application security information associated with the first application and generate a security risk score for the first application based on the application security information. The application security server 102 may determine that an application having the security risk score of the first application may require an additional test module for inclusion in the testing regime of the first application. Accordingly, the application security server 102 may direct that the automated testing system 140 modify or generate a conforming testing regime.

In general, application security information that may be used by the application security server 102 and generating a security risk score includes a count of deployed instances of the first application (the deployed instances may be application instances 138A-C in the internal computing environment 108A and/or application instances 114A-B cloud infrastructure 110 of the external computing environment 108B), the count of applications with which the application or instances of the application communicate, dependency information first application (which may include applications that depend on the first application as well as applications on which the first application depends for information or services required for proper function). In some embodiments, the application security information may be the presence and identity of a tag associated with the first application, such as a tag indicating that the first application contains or has access to sensitive information or is exposed or accessible to the Internet, which may allow bad actors easier access to the first application. The application information may include an indication of where the first application is situated in a topology of the service provider system 100. Additional application information may include an IP address or addresses associated with the first application and a region of the cloud infrastructure 110 in which an application instance is deployed. In general, any information that may indicate that an application presents a greater or lesser security risk may be used as application security information by the application security server 102 to determine a security risk score for the application.

Administrative security personnel or other users of the application security server 102 and the security application 104 executing thereon may connect to the application security server 102 by using a client device 150. The client device may be a computing device similar to servers as described herein. The client device 150 may be a computing devices such as personal computers, laptops, mobile-computing devices, such as tablet computers or smartphones, wearable computing devices, and/or any other computing devices having computing and/or communications capabilities in accordance with the described embodiments. The client device 150 includes a processing device in communication with a data storage device or memory and executes instructions corresponding to system programs and application programs to perform various computing and/or communications operations. Exemplary system programs may include, without limitation, an operating system (e.g., iOS®, Android® OS, LINUX® OS, Firefox OS™, Windows®, OS X®, Binary Run-time Environment for Wireless (BREW) OS, JavaOS, a Wireless Application Protocol (WAP) OS, and others), device drivers, programming tools, utility programs, software libraries, (APIs), and so forth. As shown in FIG. 1, the client device 150 executes software to provide an interface 152. In some embodiments, the interface 152 may be provided in connection with a web-browsing program such as Internet Explorer®, Chrome®, etc., executing on the client device 150. The client device 150 may communicate with application security server 102, and one or more of the internal devices 130 and/or the cloud infrastructure 110 over the network 120.

In some embodiments, when the application security server 102 calculates a security risk score that is greater than a threshold, such as 70 or 30, the application may be placed on a priority list that is communicated to administrative security personnel through the interface 152 as rendered by the client device 150. FIG. 3 illustrates a user interface 300 that may be an embodiment of the interface 152. User interface 300 provides a depiction of exemplary application security information presented in a table 302. The table 302 includes a list of identifiers of applications detected within the service provider system 100, and indications of what regions each listed application is instantiated in. Additionally, the table 302 includes instantiation information associated with both a production build and a test build of the application. A portion of the information included in the table 302 may be provided to the application security server 102 to identify applications instantiated within the service provider system 100. The application security server 102 may generate a security risk score for each of the identified applications. The user interface 300 includes a user interface elements permitting a user of the user interface, such as administrative security personnel, to sort the table 302 at least by name, security risk score, and category. The sorted information may be exported to another device such as the automated testing system 140.

Figure 5:
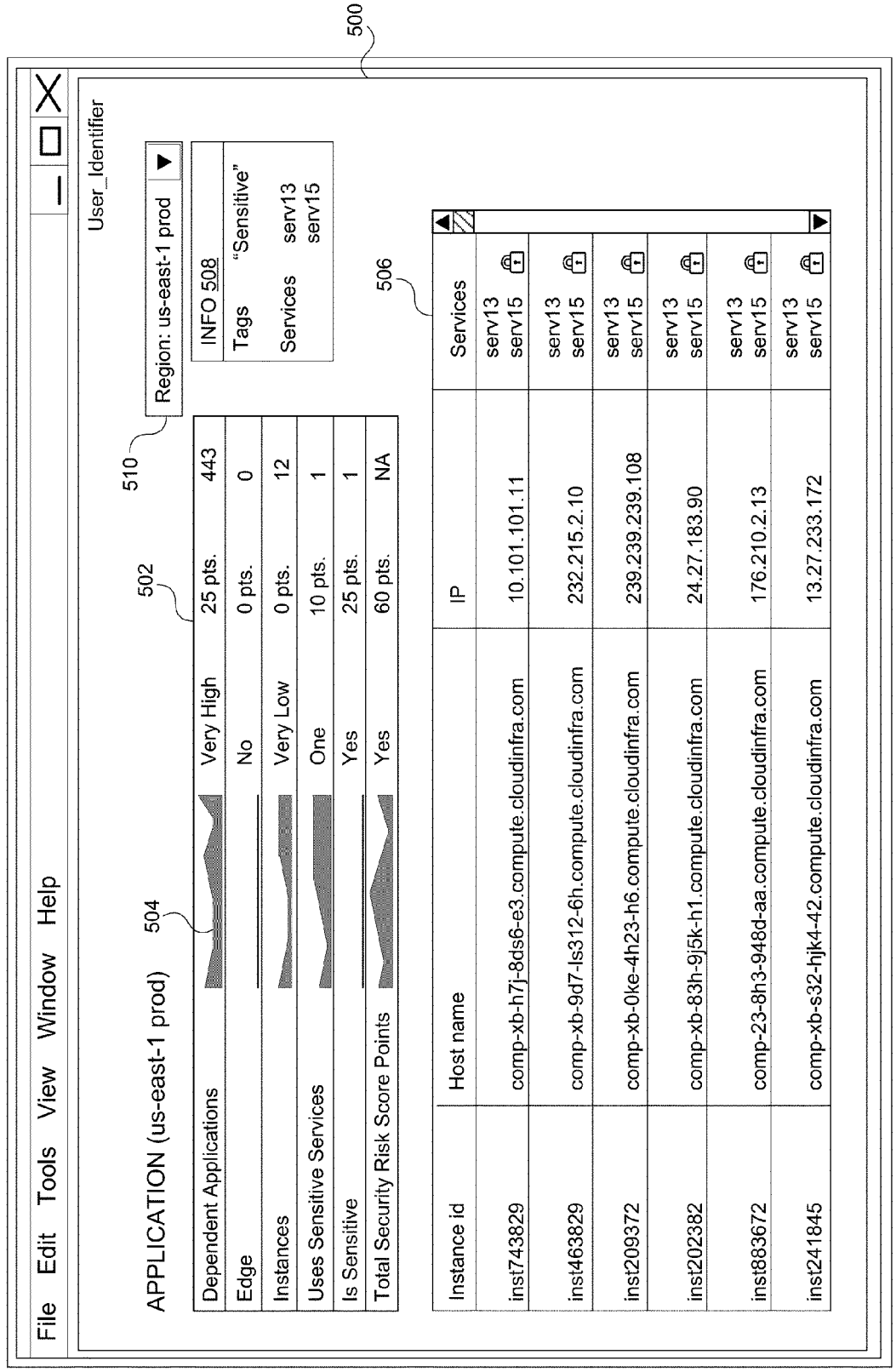

Additional embodiments of the interface 152 are illustrated as user interfaces 400 and 500 of FIGS. 4 and 5, respectively Like the user interface 300, user interfaces 400 and 500 may be presented to a user of display of a client device when interacting with the application server 102 to assess, schedule, and direct testing of applications instantiated in the service provider system 100. The user interface 400 includes a depiction of security risk scores associated with regional instantiations of a single application. The user interface 400 includes a table 402 that includes security risk score factors based on a list of application security metrics 404 which may be included in the application security information 222 of FIG. 2. As illustrated, the application security metrics 404 include dependent applications, a location at the edge of the internal computing environment 108A, a number of instances, whether or not the application uses sensitive services, and whether or not the application is sensitive. The table 402 shows that, in some embodiments, an application may have security risk scores associated with every region in which the application is instantiated. This information is provided both for a production build of the application and for a test build of the application. For example, in a 1$^{st}$ United States East region (identified by an identifier 406), the production build of the application has a security risk score of 60, because the there is a high number of dependent applications (443), a small number of instances (12) and limited use of sensitive services (1). The instantiation is sensitive and may receive 25 points because of this. As may be observed in the table 402, certain aspects of the application may be different according to the region in which it is deployed.

By selecting the identifier 406, more detailed application security information associated with the application, as deployed in the 1st United States East region, may be presented in user interface 500. The user interface 500 includes an application security information window 502 that may include, for each depicted category of application security information, a graph 504 which summarizes historical data associated with that particular category for the selected application. The historical data may span a time period, such as a week, a month, a quarter, or a year, assuming that the application has been deployed during that full time period. The user interface 500 may further include an instance list 506 which provides information regarding one or more instances of the application as deployed in the selected deployment region. An information window 508 may also be included that may list one or more security tags associated with the application. Additionally, a region selector element 510 may be included to permit a user of the user interface 500 to select a different region in which the application is deployed, without returning to the user interface 400.

Returning to FIG. 3, the user interface 300 includes a score and a category, tier, or priority level associated with each application. By sorting the information in the table 302 by security risk score or priority level, the information contained in the table 302 may provide a prioritized list, and the top 20% of scored applications may be included in the priority list. The priority list also may be communicated to the automated security testing system 140. In some embodiments, applications included in the priority list may be scheduled by the application security server 102 for penetration testing by administrative security personnel. In some embodiments, applications in the priority list may also be scheduled by the application security server 102 for testing by the automated testing system 140. The application security server 102 may divide or categorize applications based on their security risk scores. For example, the application security server 102 may create tiers of security risk scores such as a first tier including applications having security risk scores greater than or equal to 30, a second tier including applications having security risk scores less than 30 but greater than or equal to 60, a third tier including applications having security risk scores less than 60 but greater than 40, etc. The application security server 102 may automatically assign each application to a testing regime based on the tier to which it belongs. For example, the first tier may be scheduled for manual penetration testing for security testing by administrative personnel with routine and frequent (e.g., every week) automated testing by the automated testing system 140. The automated testing by the testing system 140 may include a plurality of test modules, like the test module 142. The second tier may be scheduled for penetration testing by administrative personnel on a less frequent basis than applications in the first tier and with less frequent automated testing by the testing system 140. Third tier may not be scheduled for testing by administrative security personnel but may be tested with a testing regime administered by the automated testing system 140. Accordingly, the application security server 102 may generate a testing regime appropriate to the security risk score calculated for each application or for each application according to its categorized tier.

The application security server 102 may identify every application operating within the service provider system 100 and generate or calculate a security risk score for every application. By calculating the security risk score for every application, the application security server 102 may aid administrative security personnel in directing time and resources toward the applications that present the highest security risk. Further, because application security information for a given application may change at any given time as the number or count of instances increases or decreases and the number of dependencies increases or decreases, the application security server 102 may be able to dynamically determine appropriate security testing regimes, and automatically communicate them to the automated testing system 140 for implementation thereby.

Figure 2:
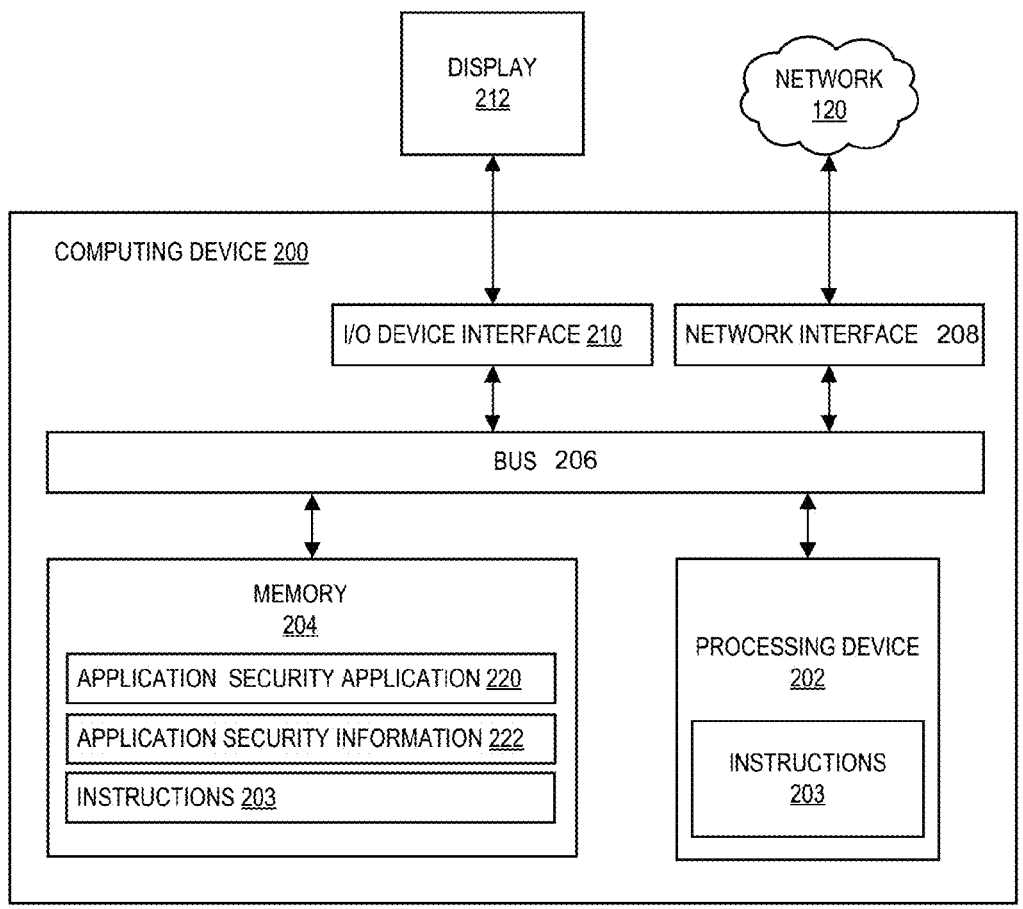
FIG. 2 is a block diagram of a computing device that may be employed as the application security server of FIG. 1, according to some embodiments of the present disclosure.

Referring now to FIG. 2, shown therein is an exemplary embodiment of a computing device 200, embodiments of which may provide the application security server 102 of FIG. 1 as described herein, the client device 150, or one of the other computing devices included in FIG. 1. The computing device 200 includes at least one processing device 202, such as one or more processors or CPUs, in communication with a data storage device or memory 204 over a bus 206. The bus 206 further couples to a network interface device 208 and an I/O device interface 210. The network interface device 208 may be a network interface card or network interface controller (NIC) that permits the computing device 200 to communicate over the network 120 of FIG. 1. The I/O device interface 210 enables the computing device 200 to communicate information to be rendered to a display 212 to display information such as data and command options in one or more graphical user interfaces associated therewith. The I/O device interface 210 may further communicate with I/O devices such as infra-red or radio-frequency remote controls, keyboards, mice, touchscreens, etc. in some embodiments, the I/O device interface 210 may be an application programming interface (API) by which the other systems of FIG. 1 may communicate with the computing device 200. Some embodiments of the computing device 200 may not include some components. For example, a server may not include an I/O device 210 or a display 212.

The processing device 202 may execute software and/or other instructions 203 stored in the memory 204. The software and information stored in the memory 204 and the instructions 203 may be different depending on whether the computing device 200 is configured as the application security server 102, the internal devices 130, the testing system 140, the client device 150, the customer device 118, or as a server underlying the cloud infrastructure 110. Additionally, the computing device 200 may be a virtual computing device in some embodiments, such as a configured resource instance in the cloud infrastructure 110. The security application 104 of FIG. 1 may be provided by executing instructions 203 on the processing device 202.

As illustrated in FIG. 2, the memory 204 stores a security application 220 and application security information 222. The memory 204 may be a collection of memories of different types that are included in a housing of the computing device or coupled to the computing device 200 and in communication therewith. For example, the memory 204 may include cache memory, RAM, ROM, flash memory, a solid-state hard drive, a disk-based hard drive, and/or other types of non-transitory memory devices. The components depicted as stored on the memory 204 may be stored on and/or accessed from any combination of these different types of memories.

The security application 220 may utilize a plurality of rules and/or algorithms that may be implemented as part of the security application 220 to calculate a security risk score for a plurality of applications deployed within the service provider system 100 of FIG. 1. For example, the security application 220 may be configured to determine from a portion of application security information 222 associated with the first application, that the first application provides access to sensitive information, such as credit card numbers, and that it faces or is exposed to the Internet. Based on these two pieces of application security information 222, the processing device 202 may execute the instructions 203 to calculate that these pieces of information result in a security risk score of 75. For example, the security application 220 may attribute 50 points to the application's security risk score because the application provides access to credit card numbers, and 25 points to the application's security risk score because the application is exposed to the Internet. Other embodiments of the security risk score calculation may include many more factors or pieces of application security information, as described herein, and may use more complex formulae in performing such calculations. Additionally, the application security information 222 may include previously calculated or historical security risk scores. In this way, the security application 220 may calculate a security risk score based on a change or rate of change observed in the security risk score of an application.

In some embodiments, the processing device 202 is configured to execute the security application 220 continuously or on a regularly scheduled basis, such as daily, twice-daily, weekly, or another scheduled basis. Additionally, the security application 220 may be executed on demand to perform an on-demand scan of applications deployed in the service provider system 100. For example, when a new security exploit is discovered and a new tool module 142 is configured to test for the new exploit, an on-demand scan may be performed. In some embodiments, administrative security personnel may use the interface 152, provided by the client device 150 in connection with the application security server 102, to request that an on-demand scan be performed or to set or modify a scan schedule.

Additionally, the security application 220 may scan application security information 222 as it is received from other devices in the service provider system 100. When the security application 220 detects a rate change or a count exceeding predefined thresholds, the security application 220 may automatically initiate a scan of all the applications executing in the environment or of a subset of all such applications. For example, the security application 220 may receive and process application security information 222 that indicates that the count of instances of a particular application, which normally has a count of about 10 instances, suddenly has a count of about 1000 instances. Upon detection of such a change in instance count of the particular application, the security application 220 may direct recalculation of a security risk score of at least the particular application. Additionally, the security application 220 may generate and transmit a notification to administrative security personnel. The notification may be communicated as an email, an SMS message, a push notification, a social stream post, or other appropriate digital notification format. Further, some embodiments of the security application 220 may automatically communicate with the automated testing system 140 to modify a testing regime associated with the particular application. For example, the security application 220 may direct the automated testing system 140 to modify the testing regime associated with particular application to direct that an immediate test using the test module 142 be performed.

In embodiments of the computing device 200 that may provide for the client device 150, the security application 220 may be a client application configured to communicate with the application security server 102. Other embodiments of the computing device 200 may provide for the client device 150 to include a web browser to communicate with the security application 220 of other embodiments of the computing device 200 configured to provide the application security server 102.

Figure 6:
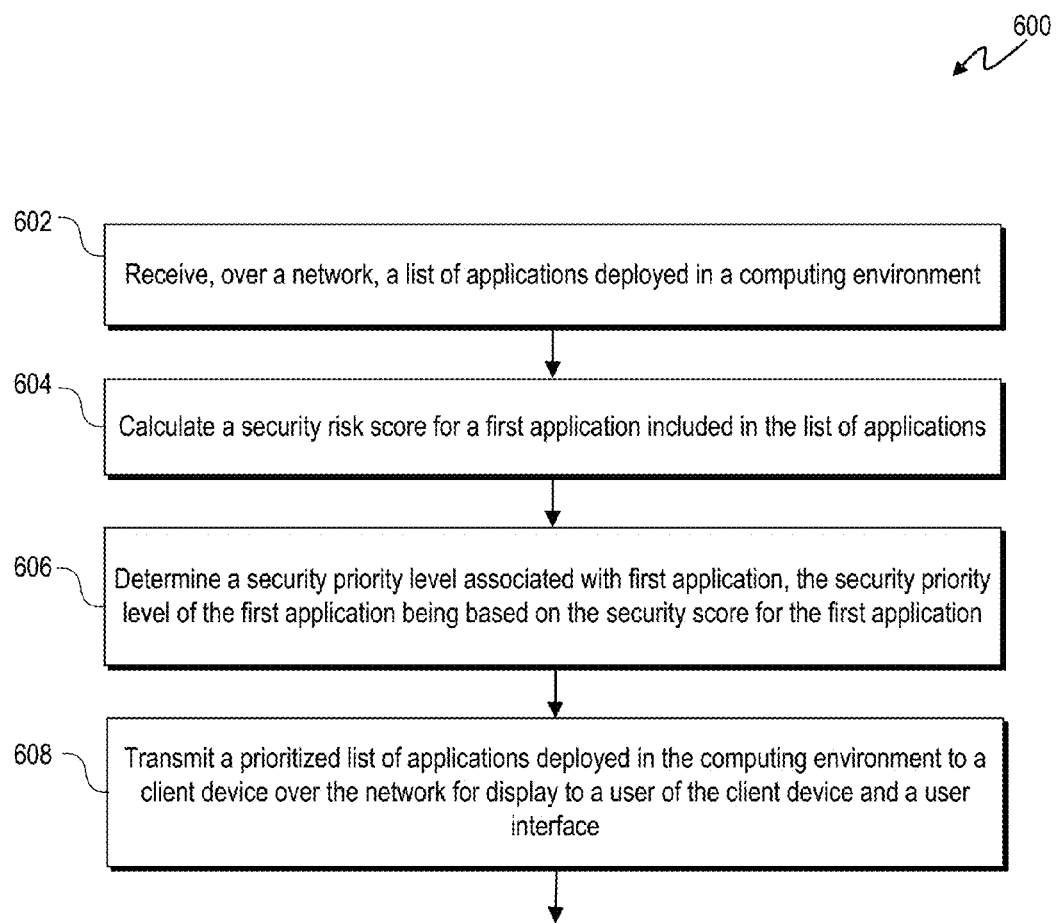
FIG. 6 is a flowchart illustrating a method of assessing, categorizing, and testing deployed applications in a service provider network, according to some embodiments of the present disclosure.

Referring now to FIG. 6, shown therein is a flowchart of a method 600 for performing security assessment, scheduling, and testing of applications deployed in a service provider system. As illustrated, method 600 includes several enumerated steps, blocks, or operations. Embodiments of the method 600 may include additional operations before, after, in between, or as part of the enumerated operations. Embodiments of the method 600 may omit one or more enumerated operations. Some embodiments of the present disclosure include instructions like the instructions 203 of FIG. 2 stored on a non-transitory computer-readable storage medium, like the memory 204 of FIG. 2. When executed, the instructions may cause a processing device, like the processing device 202 of computing device 200 to perform operations associated with embodiments of the method 600. Embodiments of the method 600 may be performed by execution of an application, such as the security applications 104 and 220 of FIGS. 1 and 2, respectively.

Embodiments of the method 600 may begin at step 602 at which a processing device in communication with one or more storage devices receives a list of applications deployed in a computing environment. The list of applications may be received over a network. For example, the processing device 202 of the computing device 200 of FIG. 2, may receive a list of applications that may include information similar to that depicted in table 302 of FIG. 3. The list of applications may be received as or from a database, such as a database stored in the database system 106. In some embodiments, the list of applications is received as a map of application dependencies of applications deployed within a service provider system 100, which may include application instances deployed in an internal computing environment 108A and application instances deployed in a portion of an external computing environment 108B operated by or on behalf of the service provider. The map of application dependencies, including its listing of applications, may be produced by information generated and exchanged upon instantiation of each application. In some embodiments, the list of applications or a portion of the list of applications may be received from the internal devices 130 and/or the list of applications or portion thereof may be received from the monitoring service 116 operating within the cloud infrastructure 110.

At step 604, the processing device may calculate a security risk score for a first application included in the list of applications. For example, the processing device 202 may execute the security application 220 to assign risk score points to a first application based on a variety of factors included in application security information 222. For example, the security application may give the application 25 points for having a high number of dependencies, 10 points for using sensitive services, and 25 points for being a sensitive service. The combined security risk score at the time of calculation by the security application 220 would thus be 60.

At step 606, the processing device may determine a security priority level or category associated with first application, the security priority level of the first application may be based on the security risk score for the first application. For example, the processing device 202 may execute the security application 220 to sort the first application into one of several categories or tiers of applications dependent on their security risk scores. For example, a first security risk category may include applications having a security risk score greater than or equal to 80. A second security risk category may include applications having a risk score greater than or equal to 60, but less than 80, while a third security risk category may include applications having a security risk score of greater than or equal to 40 but less than 60, and so on. In some embodiments, each security risk category may be associated with a text or color description, such as very high, high, medium, low, for example, which may be communicated in one of the interfaces 300, 400, or 500, as described herein.

While embodiments of the present disclosure may make use of an exemplary security risk score system ranging from 0 to 100, other scoring regimes may be used without departing from the scope of this disclosure. For example, security risk scores may be greater than 100 in some embodiments. In general, the security risk score provides a numeric score that may be used to compare one application's security risk against another application's security risk and/or to sort or categorize all of the applications present within the service provider system 100. This may enable administrative security personnel to prioritize their security testing time on applications that present the greatest real-time security risks. Additionally, the security risk scores may be used to determine a subset of applications that may be assigned an automated testing regime that is likely to be sufficient given the security risk presented by applications in the subset.

At step 608, the processing device may transmit a prioritized list of applications deployed in the computing environment to a client device over the network for display to a user of the client device in a user interface. For example, the processing device 202 may execute the security application 220 to generate and transmit the prioritize list of applications using information shown in the table 302 of user interface 300 (FIG. 3). Administrative security personnel may use the client device 150 to view the prioritize list in the interface 152.

Some embodiments of the method 600 may prioritize the list of applications based upon security risk scores, without determining a security priority level or category associated with each application. Additionally, some embodiments of the method 600 may include a step of transmitting the prioritized list to the automated testing system 140. In some embodiments, the automated testing system 140 may determine an appropriate testing regime for each application based on the prioritized or categorized list and/or the security risk scores of the applications included in the list. In some embodiments, the security application 220 may generate testing regimes based on security risk scores of applications and then transmit those testing regimes over the network 120 to the automated testing system 140 for implementation thereby. For example, the security application 220 may generate a testing regime for a first application that includes the test module 142 and a schedule for utilizing the test module 142 to scan for security problems associated with the first application.

The application security information 222 that may be used by the security application 220 in calculating or determining security risk scores for a plurality of applications may include any information indicative of a potential security risk. For example, the application security information 222 may include a count of instances of the first application, a region in which instances of the application are deployed, build information (such as a version, a build date, an owner, a team) associated with the first application, a dependency map showing dependencies of the first application, and/or a security tag associated with first application. The application security information 222 associated with the first application may also be information identifying one or more ports, one or more protocols, and one or more domain names utilized by the first application. In some embodiments, the application security information 222 may include an indication of whether an application processes or accesses media items included copyrighted content, especially unencrypted copyrighted content, or accesses content encryption keys.

Figure 7:
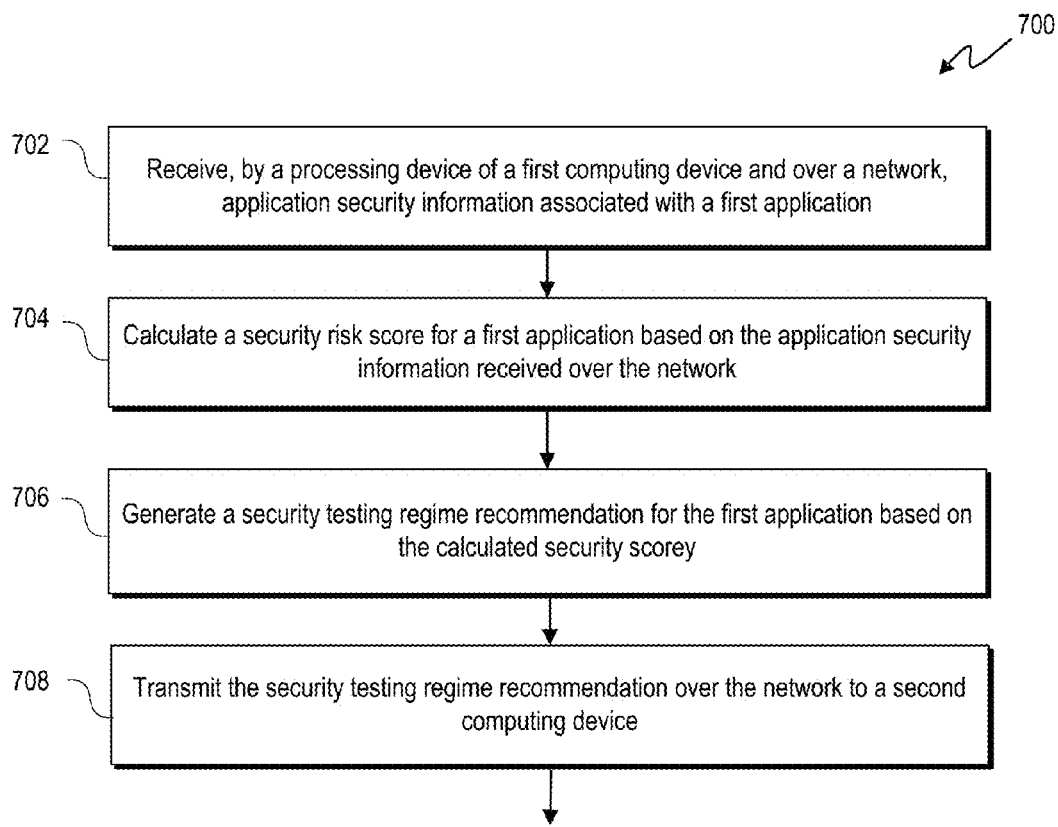
FIG. 7 is a flowchart illustrating another method of assessing, categorizing, and testing deployed applications in a service provider network, according to some embodiments of the present disclosure.

Referring now to FIG. 7, illustrated therein is a flowchart of a method 700 of performing security assessment and testing of a plurality of applications deployed in a service provider system. As illustrated, method 700 includes several enumerated steps, blocks, or operations. Embodiments of the method 700 may include additional operations before, after, in between, or as part of the enumerated operations. Embodiments of the method 700 may omit one or more of the enumerated operations. Some embodiments of the method 700 may include instructions like the instructions 203 of FIG. 2 stored on a non-transitory computer-readable storage medium, like the memory 204 of FIG. 2. When executed, the instructions 203 may cause a processing device, like the processing device 202 of computing device 200 to perform operations associated with embodiments of the method 700. Embodiments of the method 700 may be performed by execution of an application, such as the security applications 104 and 220 of FIGS. 1 and 2, respectively.

Embodiments of the method 700 may begin at step 702, at which a processing device of a first computing device receives, over a network, application security information associated with a first application. For example, the processing device 202 of the computing device 200 (configured as the application security server 102) may receive application security information 222 from one or more sources over the network 120. For example, the processing device 202 may communicate with the internal devices 130, the automated testing system 140, and/or the monitoring service 116 to request and/or receive application security information 222. The application security information 222 may include any information indicative of a potential security risk of each of a plurality of applications deployed in the service provider system 100 of FIG. 1.

At step 704, the processing device may calculate a security risk score for a first application based on the application security information received over the network. For example, the processing device 202 may execute the security application 220 to generate a security risk score for the first application. The security risk score may be calculated by assigning points to each of a variety of factors determined to be relevant to the potential security risk posed by the application, as described herein.

At step 706, the processing device may generate a security testing regime recommendation for the first application based on the calculated security risk score. For example, the processing device 202 may generate a security testing regime for the application indicating that Nessus and OWASP ZAP test modules are to be run against the application on a weekly basis. The security testing regime may include other test modules and/or other periodic schedules. Embodiments of the security testing regime generated by the processing device 202 may dictate that the first test module should be run every week while a second test module should be run every other week. Accordingly, the processing device 202 may generate a security testing regime that is appropriate to the particular security risks posed by the first application, as indicated by the application security information associated with that application.

At step 708, the processing device may transmit the security testing regime recommendation over the network to a second computing device. For example, the processing device 202 may transmit digital instructions comprising the security testing regime to the automated testing system 140 for implementation thereby. In some embodiments, the processing device 202 may transmit the security testing regime as a recommended security testing regime to the client device 1504 presentation to administrative security personnel or other users in the interface 152. In some embodiments, the user may accept, reject, or modify the recommended security testing regime prior to implementation thereof by the automated testing system 140. Accordingly, the processing device 202 may receive an indication of acceptance, rejection, or modification of the security testing regime prior to transmission to the automated testing system 140 for implementation.

As described herein, the application security information that the processing device 202 may use to calculate the security risk score for an application and to generate a security testing regime recommendation for the application may include information regarding instances of the application deployed within an internal computing environment 108A and instances of the application deployed within an external computing environment 108B. The application security information may include a real-time count of instances of the first application deployed in the cloud infrastructure and/or a rate of increase in the count of instances of the first application deployed in the cloud infrastructure. When the rate of increase in the count of instances is employed, real time and historical counts of instances may be relied upon in determining the rate of increase (or of decrease) in the count of instances.

Additionally, some embodiments of the method 700 may include a pointer to the source code of the first application as part of the security testing regime recommendation. The pointer may be used by the automated testing system 140 to locate source code with which to test using one or more test modules. At the time of a scheduled test, the automated testing system 140 may retrieve a copy of the source code using the pointer, address, or other locating information to identify the appropriate source code within the source code repository 133 of FIG. 1. In some embodiments, the application security server 102 may determine whether there are dependencies in the source code of two applications.

Embodiments of the presently disclosed systems, servers, devices, and methods may provide for security assessment, scheduling, and testing of large numbers of applications deployed in a complex service provider system. An application security server and/or security application may process application security information to calculate a security risk score for each of the applications deployed in the complex provider system. Based on the security risk scores, the application security system may determine appropriate automated and/or manual tests that should be performed in order to maintain the security and integrity of the service provider system. The application security system may also provide administrative security personnel with information allowing the personnel to prioritize their time and efforts in performing more detailed penetration tests on a subset of applications instantiated within the service provider system. The security risk scores may factor in current, real-time information about the server provider system 100 and that applications deployed therein.

Certain aspects of the present disclosure are set out the following numbered clauses:

1. An application security system, the system comprising: an application security server having a processing device in communication with one or more storage systems; a plurality of computing devices, the computing devices executing a plurality of application instances configured to receive and transmit information over a network; and a security testing system including a plurality of security test modules, wherein the test modules include a first test module associated with a first application associated with one or more of the application instances; and wherein the processing device of the application security server: retrieves information about the first application, the information including current dependency information of the first application, calculates a security risk score for the first application, the security risk score calculated based on the information about the first application, determines a security priority level associated with first application, the security priority level of the first application being based on the security risk score for the first application, and associates the security priority level of the first application with the first application in a database of application security information.

2. The application security system of clause 1, wherein the application security server communicates with the security testing system to access testing information associated with the first application, the testing information indicating a most recent test time at which the first test module was used to test the first application.

3. The application security system of any of clauses 1-2, wherein the security risk score for the first application is calculated based on the most recent test time at which the first test module was used to test the first application and a test schedule associated with the first application.

4. The application security system of any of clauses 1-3, wherein the information about the first application comprises at least one of: a count of deployed instances of the first application; a tag associated with the first application, the tag indicating the first application contains or has access to sensitive information; a count of applications with which the first application communicates; an accessibility of the first application from the Internet; and the current dependency information of the first application.

5. The application security system of any of clauses 1-4, wherein the count of deployed instances of the first application is a first real-time count and the count of applications with which the first application communicates is a second real-time count.

6. The application security system of any of clauses 1-5, further comprising a cloud infrastructure in communication with the application security server over the network, the cloud infrastructure including a plurality of deployed application instances, and wherein the first application communicates with at least one of the deployed application instances.

7. The application security system of any of clauses 1-6, wherein the cloud infrastructure includes a monitoring service configured to report information about applications deployed to the cloud infrastructure, the deployed application information including counts of deployed application instances and security information associated with the deployed applications.

8. The application security system of any of clauses 1-7, wherein the application security server includes a map of dependencies between applications based on information received from each application upon initialization of each application.

9. The application security system of any of clauses 1-8, wherein the processing device of the application security server communicates with the security testing system to change a testing regime associated with the first application.

10. The application security system of any of clauses 1-9, wherein the testing regime includes one or more test modules to be applied in testing the first application and a schedule directing when the test modules are to be applied to test the first application.

10.1. A non-transitory computer-readable storage medium storing instructions that, when executed by one or more processing devices, cause the processing devices to perform any of the features recited in any of clauses 1-10.

10.2. A computer program product including instructions that, when implemented on one or more processing devices, carries out any of the features recited in any of clauses 1-10.

10.3. A method that, when implemented by one or more processing devices, performs operations providing any of the features recited in any of clauses 1-10.

11. An application security system, comprising: a processing device in communication with one or more storage devices, the one or more storage devices including instructions stored thereon; and a network interface enabling the processing device to communicate over a network with one or more other devices, and wherein the processing device executes the instructions to: receive, over the network, a list of applications deployed in a computing environment; calculate a security risk score for a first application included in the list of applications; determine a security priority level associated with first application, the security priority level of the first application being based on the security risk score for the first application; and transmit a prioritized list of applications deployed in the computing environment to a client device over the network for display to a user of the client device in a user interface.

12. The application security system of clause 11, wherein the processing device further executes the instructions to request application security information from the one or more other devices, the application security information including at least one of: a count of instances of the first application; a region in which the application is deployed; build information associated with the first application; a list of applications with which the first application is configured to communicate; and a security tag associated with the first application.

13. The application security system of any of clauses 11-12, wherein the application security information associated with the first application identifies a port, a protocol, or a domain name system (DSN) name utilized by the first application.

14. The application security system of any of clauses 11-13, wherein the security priority level associated with the first application indicates that the first application is to undergo a manual testing process by administrative security personnel, and wherein the processing device executes the instructions to send an electronic notification to the administrative security personnel communicating the security priority level associated with the first application.

14.1. A non-transitory computer-readable storage medium storing instructions that, when executed by one or more processing devices, cause the processing devices to perform any of the features recited in any of clauses 11-14.

14.2. A computer program product including instructions that, when implemented on one or more processing devices, carries out any of the features recited in any of clauses 11-14.

14.3. A method that, when implemented by one or more processing devices, performs operations providing any of the features recited in any of clauses 11-14.

15. A method comprising: receiving, by a processing device of a first computing device and over a network, application security information associated with a first application; calculating a security risk score for a first application based on the application security information received over the network; generating a security testing regime recommendation for the first application based on the calculated security risk score; and transmitting the security testing regime recommendation over the network to a second computing device.

16. The method of clause 15, wherein the first application is deployed in a cloud infrastructure and wherein receiving application security information associated with the first application comprises receiving the application security information from a monitoring service operating within the cloud infrastructure.

17. The method of any of clauses 15-16, wherein the application security information comprises a real time count of instances of the first application deployed in the cloud infrastructure and a rate of increase in the count of instances of the first application deployed in the cloud infrastructure.

18. The method of any of clauses 15-17, further comprising identifying a plurality of applications operating within a computing environment that includes an account of the cloud infrastructure.

19. The method of any of clauses 15-18, wherein transmitting the security testing regime recommendation over the network to the second computing device comprises: transmitting an instruction to a security testing system to apply a first test module when the security testing system performs a security test on the first application.

20. The method of any of clauses 15-19, wherein the application security information includes a pointer to a source code of the first application in a source code repository and wherein the pointer is included in the security testing regime recommendation.

20.1. A non-transitory computer-readable storage medium storing instructions that, when executed by one or more processing devices, cause the processing devices to perform any of the features recited in any of clauses 15-20.

20.2. A computer program product including instructions that, when implemented on one or more processing devices, carries out any of the features recited in any of clauses 15-20.

20.2. A computing system that, when implemented by one or more processing devices, performs operations providing any of the features recited in any of clauses 15-20.

Although the foregoing aspects of the present disclosure have been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. An application security system, the system comprising:
an application security server having a processing device in communication with one or more storage systems;
a plurality of computing devices, the computing devices executing a plurality of application instances configured to receive and transmit information over a network; and
a security testing system including a plurality of security test modules, wherein the test modules include a first test module associated with a first application associated with one or more of the application instances; and
wherein the processing device of the application security server:
retrieves information about the first application, the information including current dependency information of the first application,
calculates a security risk score for the first application, the security risk score calculated based on the information about the first application, wherein the information about the first application comprises at least one of: a count of deployed instances of the first application, a count of applications with which the first application communicates, and an accessibility of the first application from the Internet, and wherein the count of deployed instances of the first application is a first real-time count and the count of applications with which the first application communicates is a second real-time count,
determines a security priority level associated with first application, the security priority level of the first application being based on the security risk score for the first application, and
associates the security priority level of the first application with the first application in a database of application security information.

2. The application security system of claim 1, wherein the application security server communicates with the security testing system to access testing information associated with the first application, the testing information indicating a most recent test time at which the first test module was used to test the first application.

3. The application security system of claim 2, wherein the security risk score for the first application is calculated based on the most recent test time at which the first test module was used to test the first application and a test schedule associated with the first application.

4. The application security system of claim 1, further comprising a cloud infrastructure in communication with the application security server over the network, the cloud infrastructure including a plurality of deployed application instances, and wherein the first application communicates with at least one of the deployed application instances.

5. The application security system of claim 4, wherein the cloud infrastructure includes a monitoring service configured to report information about applications deployed to the cloud infrastructure, the deployed application information including counts of deployed application instances and security information associated with the deployed applications.

6. The application security system of claim 1, wherein the application security server includes a map of dependencies between applications based on information received from each application upon initialization of each application.

7. The application security system of claim 1, wherein the processing device of the application security server communicates with the security testing system to change a testing regime associated with the first application.

8. The application security system of claim 7, wherein the testing regime includes one or more test modules to be applied in testing the first application and a schedule directing when the test modules are to be applied to test the first application.

9. An application security system, comprising:
a processing device in communication with one or more storage devices, the one or more storage devices including instructions stored thereon; and
a network interface enabling the processing device to communicate over a network with one or more other devices, and wherein the processing device executes the instructions to:

receive, over the network, a list of applications deployed in a computing environment;

calculate a security risk score for a first application included in the list of applications, the security score being based on at least one of: a count of deployed instances of the first application, a count of applications with which the first application communicates, and an accessibility of the first application from the Internet, and wherein the count of deployed instances of the first application is a first real-time count and the count of applications with which the first application communicates is a second real-time count;

determine a security priority level associated with first application, the security priority level of the first application being based on the security risk score for the first application; and transmit a prioritized list of applications deployed in the computing environment to a client device over the network for display to a user of the client device in a user interface.

10. The application security system of claim 9, wherein the processing device further executes the instructions to request application security information from the one or more other devices, the application security information including at least one of:

the count of deployed instances of the first application;
a region in which the application is deployed;
build information associated with the first application;
a list of applications with which the first application is configured to communicate; and
a security tag associated with the first application.

11. The application security system of claim 10, wherein the application security information associated with the first application identifies a port, a protocol, or a domain name system (DSN) name utilized by the first application.

12. The application security system of claim 9, wherein the security priority level associated with the first application indicates that the first application is to undergo a manual testing process by administrative security personnel, and wherein the processing device executes the instructions to send an electronic notification to the administrative security personnel communicating the security priority level associated with the first application.

13. A method comprising:

receiving, by a processing device of a first computing device and over a network, application security information associated with a first application;

calculating, by the processing device, a security risk score for a first application based on the application security information received over the network, the security score being based on at least one of: a count of deployed instances of the first application, a count of applications with which the first application communicates, and an accessibility of the first application from the Internet, and wherein the count of deployed instances of the first application is a first real-time count and the count of applications with which the first application communicates is a second real-time count;

generating, by the processing device, a security testing regime recommendation for the first application based on the calculated security risk score; and transmitting, by the processing device, the security testing regime recommendation over the network to a second computing device.

14. The method of claim 13, wherein the first application is deployed in a cloud infrastructure and wherein receiving application security information associated with the first application comprises receiving the application security information from a monitoring service operating within the cloud infrastructure.

15. The method of claim 14, wherein the application security information comprises a rate of increase in the count of instances of the first application deployed in the cloud infrastructure.

16. The method of claim 14, further comprising identifying a plurality of applications operating within the computing environment, the computing environment including an account of the cloud infrastructure.

17. The method of claim 13, wherein transmitting the security testing regime recommendation over the network to the second computing device comprises: transmitting an instruction to a security testing system to apply a first test module when the security testing system performs a security test on the first application.

18. The method of claim 13, wherein the application security information includes a pointer to a source code of the first application in a source code repository and wherein the pointer is included in the security testing regime recommendation.

* * * * *